United States Patent [19]
Ladin

[11] 3,978,566
[45] *Sept. 7, 1976

[54] PROCESS FOR MAKING SECTIONALIZED PRECISION COMPONENTS

[75] Inventor: Eli M. Ladin, Ann Arbor, Mich.

[73] Assignee: Federal-Mogul Corporation, Southfield, Mich.

[ * ] Notice: The portion of the term of this patent subsequent to Mar. 18, 1992, has been disclaimed.

[22] Filed: Jan. 17, 1975

[21] Appl. No.: 541,998

Related U.S. Application Data

[63] Continuation-in-part of Ser. No. 444,120, Feb. 20, 1974, Pat. No. 3,871,093.

[52] U.S. Cl. ................... 29/148.4 A; 29/DIG. 26; 29/DIG. 1; 29/413; 29/427
[51] Int. Cl.² .................. B23P 11/00; B23P 17/00; B21H 1/12
[58] Field of Search .............. 29/423, 559, 148.4 A, 29/148.4 R, 149.5 R, 427, DIG. 26; 51/323

[56] References Cited
UNITED STATES PATENTS

| 2,424,835 | 7/1947 | Luckey et al. | 51/323 |
| 3,704,515 | 12/1972 | Nelson | 29/423 X |
| 3,803,774 | 4/1974 | Miller | 51/323 X |
| 3,808,668 | 5/1974 | Connell | 29/559 X |
| 3,871,093 | 3/1975 | Ladin | 29/148.4 A |

*Primary Examiner*—C.W. Lanham
*Assistant Examiner*—V. K. Rising
*Attorney, Agent, or Firm*—Harness, Dickey & Pierce

[57] ABSTRACT

A process for fabricating precision components of the type including at least one member which is of a sectionalized construction comprising a plurality of assemblable mated sections. The sectionalized member is produced from a plurality of preliminarily formed sections which are adhesively secured into a bonded assembly which is finish machined as a unit, whereafter the bonded assembly is cleaved to provide a matched set of sections for use in the final assembly of the component.

18 Claims, 13 Drawing Figures

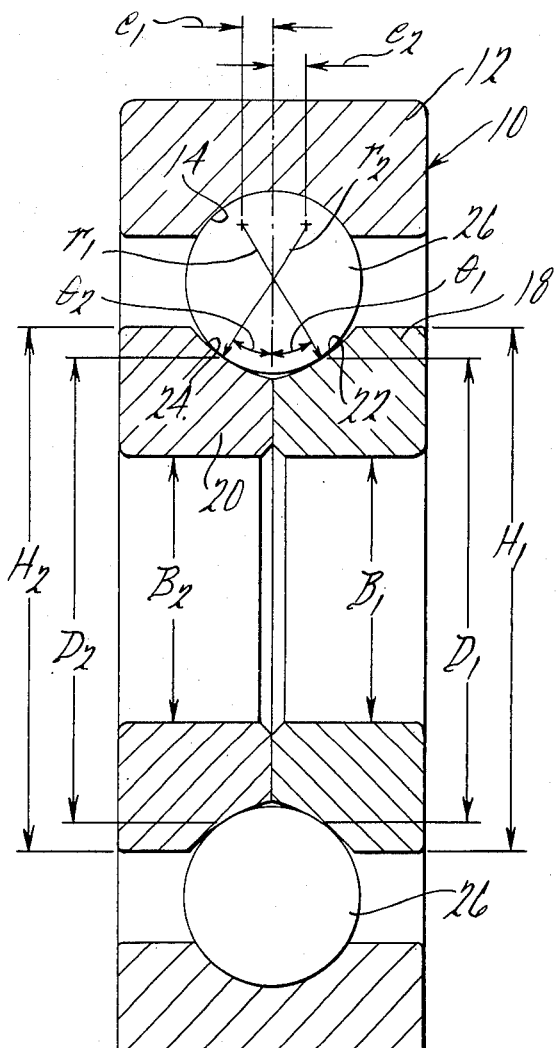
Fig. 1.
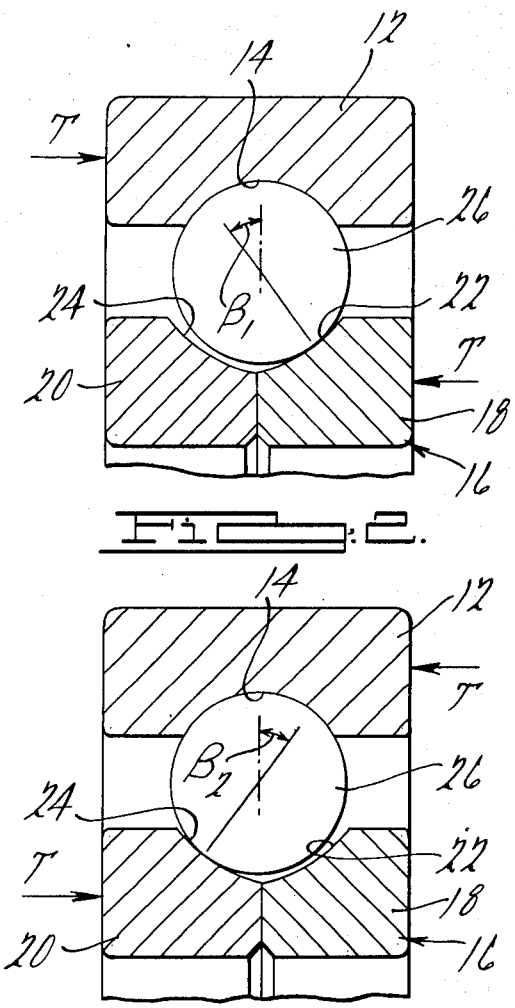
Fig. 2.
Fig. 3.
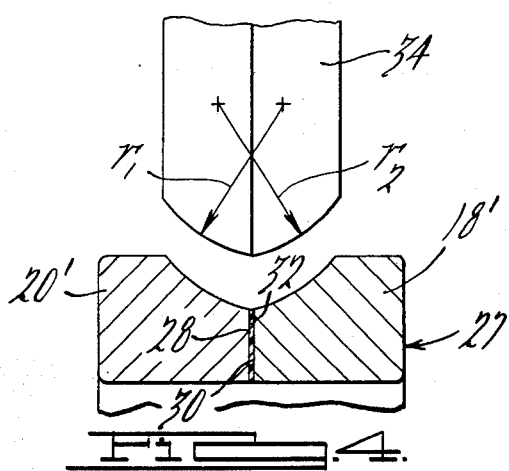
Fig. 4.
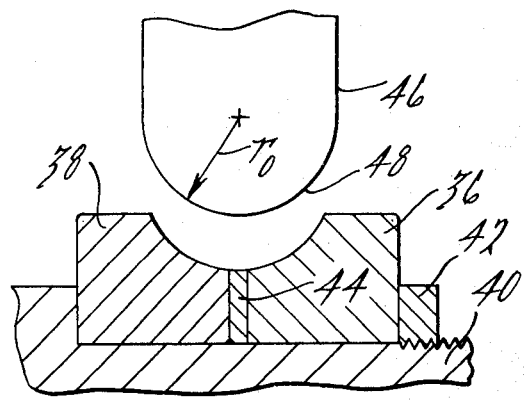
Fig. 5.

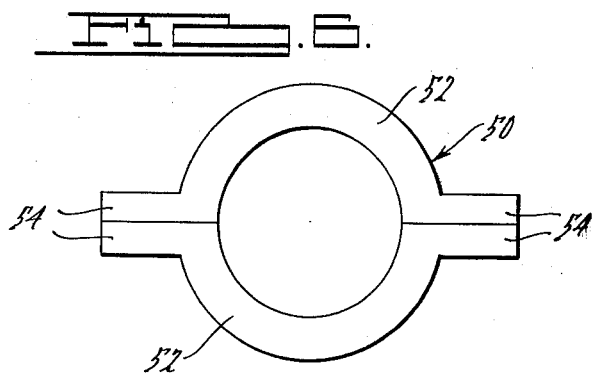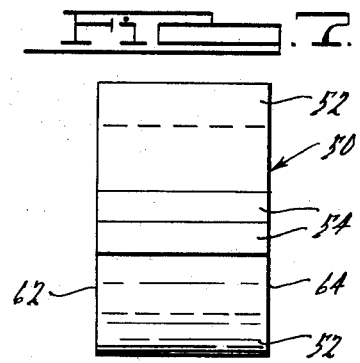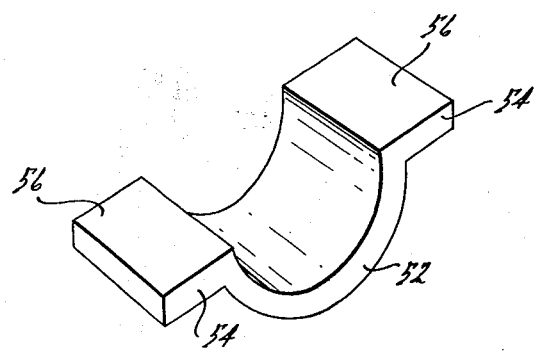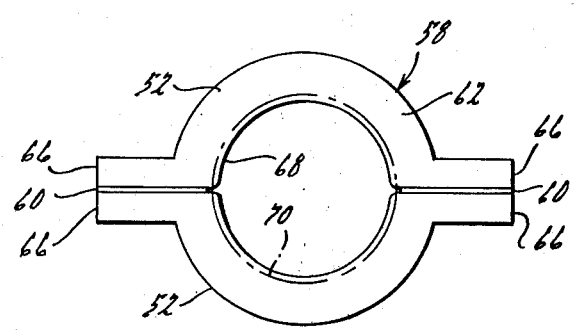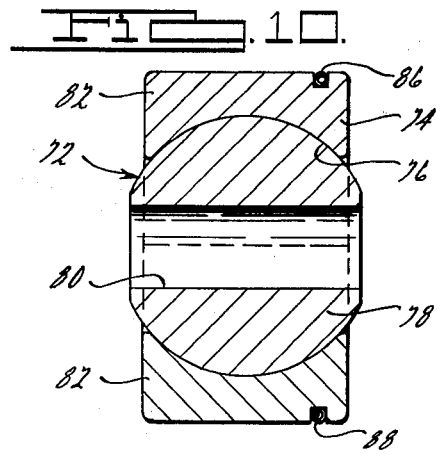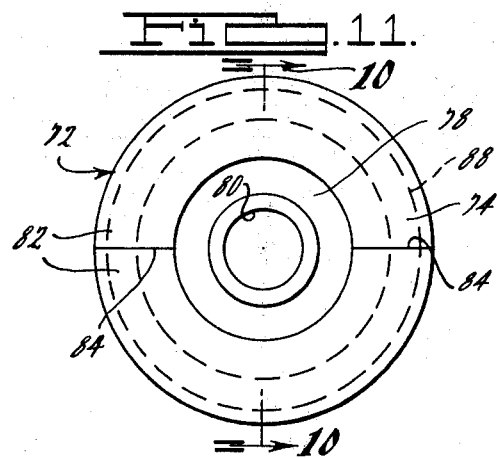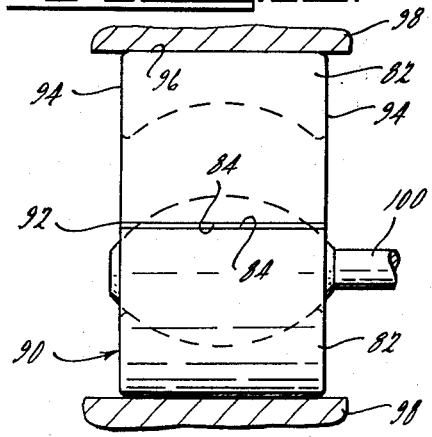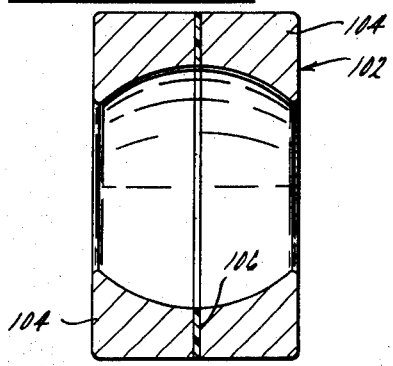

PROCESS FOR MAKING SECTIONALIZED PRECISION COMPONENTS

CROSS REFERENCE TO RELATED APPLICATIONS

This application comprises a continuation-in-part of copending application Ser. No. 444,120, filed Feb. 20, 1974, for "Process for Making Split-Ring Ball Bearings", now U.S. Pat. No. 3,871,093.

BACKGROUND OF THE INVENTION

The present invention is particularly applicable but not necessarily limited to the manufacture of split shell bearings, self-aligning bushings and precision split-ring ball bearing assemblies of the angular contact type incorporating either a single or plural rows of balls and which are particularly adapted for carrying thrust loads, as well as radial loading. Of the foregoing, split-ring ball bearings are suitable for use in turbine engines, torque converters, machine tool spindles, deep well pumps and various high load and/or high speed applications requiring precision performance under conditions in which a combination of radial and thrust loads are encountered. The bearing is also applicable for use in non-precision applications, such as in conveyors, for example, in which greater latitude in the dimensional tolerances of such bearings can be tolerated. In either event, it is conventional in bearings of the foregoing type to split either the inner or outer race or ring member to enable an assembly of the maximum number of balls or antifriction elements, thereby optimizing the load carrying properties and durability of the bearing.

It has been conventional in accordance with prior art practices for manufacturing split-ring bearing assemblies to manually inspect the machined ring sections comprising each split race member in an effort to achieve a substantially identical set of mated ring sections. In spite of the use of modern precision machining techniques, it is ordinarily impossible to effect a mating of identical ring sections, which necessitates a further final finishing such as by grinding of the preliminarily mated ring set. Conventionally, the ring sets are mounted on suitable fixtures and are clamped thereon using a spacer, such as a precision shim, between the abutting faces of the ring sections. The preliminarily matched set thereafter is processed together through all of the final finishing operations including race grinding, land grinding, bore honing, radial clearance measurements, outer ring mating, washing and final packaging. During such processing, the ring sections are held together by various special fixtures, metal straps and wires, in order to permit the necessary finishing operations to be performed and which usually require a removal and remounting or retying on passing from one operation to the next operation. The foregoing tedious, time consuming and costly manufacturing operation is necessary since the individual ring sections comprising the split or sectionalized ring member must be as symmetrical and as identical to one another as possible in order to provide for optimum load carrying capacity, performance and durability.

In spite of the painstaking inspection and measurements made of individual ring sections in an attempt to form matched sets and thereafter the concurrent processing of such sets while positioned on elaborate fixtures, the resultant sectionalized race members produced still are not exactly identical due to the geometric variations that inherently exist in randomly and separately manufactured components, which in turn prevents the attainment of optimum functional properties of the final bearing assembly.

The foregoing enumerated problems associated with the manufacture of precision split-ring bearing assemblies are also present in the manufacture of a variety of precision components of the type including at least one member which is of a sectionalized construction comprised of a plurality of assemblable mated sections which heretofore have required the careful match-mating of individual sections. Exemplary of the foregoing are split thick-walled shell or sleeve bearings and bushings, as well as self-aligning bushings, the latter comprising a bushing member having a spherical periphery slidably disposed within a housing having a conforming spherical seat to permit relative movement therebetween.

In an attempt to overcome the foregoing problems associated with the manufacture of precision sectionalized components, it has heretofore been proposed to machine the precision components as an integral unit or to weld the individual sections together to form an integral unit and after the completion of the precision machining operation, to cut or sever the integral components into the separate sections. The foregoing practices have not received widespread commercial acceptance for a number of reasons, not least of which is the cost associated with the cutting or severing operations, as well as the damage or distortion that is sustained by the separated sections as a result of the separation process.

The present invention overcomes the problems and disadvantages associated with prior art manufacturing processes of precision components, providing not only a precision mating of individual sections, but also providing for a substantial simplification and reduction in costs heretofore associated with such manufacturing operations.

SUMMARY OF THE INVENTION

The benefits and advantages of the present invention are achieved by a process for fabricating precision components or parts which conventionally comprise a plurality of members, of which at least one is of a split or sectionalized construction comprised of a plurality of matched sections. The individual sections are separately manufactured to within normally broad tolerances, and whereafter a random selection and mating of the individual sections is effected and the resultant set is adhesively secured together into a bonded assembly. The resultant bonded assembly is processed as in the case of integral members to effect a final accurate finishing and grinding of the surfaces thereof, including any bores, lands and shoulders, for example, thereby automatically producing a perfectly matched set of sections. Thereafter, the adhesive bond is cleaved, enabling a separation of the individual sections preparatory to their assembly with any other parts to form the assembled precision component.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a transverse vertical sectional view of a typical angular contact ball bearing having a split inner ring member adapted for manufacture in accordance with the practice of the present invention;

FIG. 2 is a fragmentary sectional view of the ball bearing shown in FIG. 1 having imposed thereon a thrust load in one direction;

FIG. 3 is a fragmentary sectional view similar to FIG. 2 showing the ball bearing having a thrust load imposed thereon in a direction opposite to that shown in FIG. 2;

FIG. 4 is a fragmentary elevational view, partly in section, of a split inner ring assembly bonded by an adhesive preparatory to a finish grinding of the raceway;

FIG. 5 is a fragmentary elevational view, partly in section, illustrating the grinding of a split inner ring in accordance with prior art practices;

FIG. 6 is an end elevational view of a split flanged thick-wall shell bearing adapted for manufacture in accordance with the practice of the present invention;

FIG. 7 is a side view of the bearing shown in FIG. 6;

FIG. 8 is a perspective view of one preliminarily machined shell section of the bearing shown in FIG. 6;

FIG. 9 is an end elevational view of an adhesively-bonded assembly comprising two of the shell members shown in FIG. 8 preparatory to the final precision machining operations;

FIG. 10 is a longitudinal vertical sectional view through a self-aligning spherical bushing as taken along the line 10—10 of FIG. 11, which also can advantageously be manufactured in accordance with the practice of the present invention;

FIG. 11 is an end elevational view of the self-aligning bushing and surrounding housing shown in FIG. 10;

FIG. 12 is a fragmentary side elevational view of the housing of the self-aligning bushing shown in FIG. 10, which has been adhesively bonded so as to enable final finishing of the inner spherical surface thereof; and FIG. 13 is a vertical longitudinal sectional view of an adhesively bonded housing assembly of an alternative satisfactory sectionalized construction from that shown in FIGS. 10–12.

DESCRIPTION OF THE PREFERRED EMBODIMENTS

Referring now in detail to the drawings, and as may be best seen in FIGS. 1–3, an angle contact ball bearing assembly, indicated at 10, is illustrated incorporating a split inner ring member which is typical of those suitable for manufacture in accordance with the process of the present invention. As shown, the ball bearing assembly comprises an outer ring or raceway member 12 incorporating an annular raceway 14 and an inner split-ring or raceway member 16 comprised of a pair of mated ring sections 18 and 20. The ring section 18 defines an arcuate raceway 22, while the ring section 20 defines a corresponding raceway 24, which in combination with the raceway 14 of the outer ring member serve to retain a plurality of antifriction elements, such as balls 26, in circumferentially spaced relationship therealong.

In order to achieve optimum load carrying capacity, performance and durability of such split-ring bearings, it is important that certain dimensional relationships between the two ring sections 18, 20 be as identical as possible. In the exemplary split-ring member 16 illustrated in FIG. 1, the ring sections are symmetrical such that the following important dimensions should be substantially identical: bore $B_1 = B_2$; land diameter $H_1 = H_2$; race diameter $D_1 = D_2$; race radius $r_1 = r_2$; rest angle $\theta_1 = \theta_2$ and axial offset of the center of raceway curvature with respect to the center line of the raceway $e_1 = e_2$.

By maintaining an accurate mating of the two ring sections, the imposition of thrust loading on the bearing in either direction as illustrated in FIGS. 2 and 3 by the arrows causes a slight axial offset of the inner and outer race members such that the actual angle of contact of the balls 26 are equal ($\beta_1 = \beta_2$). In the specific embodiment illustrated, the raceway of the inner ring member as defined by races 22 and 24 of the ring sections is of a gothic arch configuration, while the raceway 14 of the outer ring member is of a uniform radius concentric with that of the periphery of the balls 26. It will be appreciated that the magnitude of offset ($e_1$, $e_2$) can vary to provide any desired negative race radius offset, as well as any desired positive value and can also be different for each ring section in order to optimize the performance of the bearing consistent with its intended end use. It will be further understood that the process as subsequently to be described is also applicable to bearings in which the outer ring member is split or of a sectionalized construction in addition to bearings including double or plural rows of antifriction elements, as well as a plurality of individual split-ring bearings mounted in tandem relationship to provide the necessary load carrying capacity.

In accordance with the present process, the individual ring sections are preliminarily machined in accordance with conventional machining practices to dimensional tolerances within several thousandths of an inch and are thereafter selected at random and mated into preliminary sets. The ring sets are thereafter adhesively secured into a bonded assembly 27 by means of an adhesive layer, indicated at 28 in FIG. 4, applied between the abutting faces 30, 32 of preliminarily machined ring sections 18', 20'. It is usually preferred to remove any cutting oils, lubricants or other residual contaminating substances from the abutting faces 30, 32 to assure the attainment of a uniform and high strength adhesive bond. The adhesive layer 28 is applied in the form of a thin film having a thickness usually ranging from about 0.0001 to about 0.0003 inch and is allowed to set and/or cure for the required time period in accordance with the characteristics of the specific adhesive material employed.

Once the adhesive has set, the bonded assembly 27 is processed in the same manner as an integral ring member, such as the outer member 12, to effect a honing of the bore, a grinding of the lands, a grinding of the side faces and a final grinding of the raceways employing a grinding wheel indicated at 34 in FIG. 4. The cutting periphery of the grinding wheel is of a gothic arch configuration as defined by radii $r_1$, $r_2$, providing the desired curvature and offset. The processing of the bonded assembly 27 through the several final finishing operations, including intervening inspections and measurements, is performed without the need of mounting the bonded assembly on special fixtures or tying or strapping the ring sections together as is required in accordance with prior art practices. At the conclusion of the final finishing and measuring operations, the bonded assembly 27 is matched with an outer ring member 12 and the necessary number of balls or antifriction elements and the resulting matched components are thereafter retained as a matched group through the remaining assembly and packaging operation. The bonded assembly 27 can readily be cleaved into the individual ring sections by imposing a shear load on the adhesive bond line, causing a rupture thereof and, whereafter, if desired, the abutting faces 30, 32 can be further cleaned, such as by solvent, to remove any residual adhesive remaining thereon.

FIG. 5 is provided as a basis of comparing prior art practices with the present process in which carefully measured and selected ring sections 36, 38 are securely mounted on a fixture including a spindle 40 and clamping nut 42. A shim 44 of an accurate thickness is placed between the ring sections preliminary to the race grinding operation. As shown in FIG. 5, a grinding wheel 46 having a peripheral cutting face 48 of a constant radius $r_o$ is employed. Upon the completion of the race grinding operation, the shim 44 is removed so that upon movement of the two ring sections toward each other until their abutting faces contact, a similar gothic arch raceway configuration is provided as in the case of the grinding operation illustrated in FIG. 4. It will be appreciated from the arrangement illustrated in FIG. 5 that a demounting and remounting of the individual ring sections is repeatedly necessitated in order to enable successive grinding or honing of the bore and side faces of the inner ring member, which constitutes a tedious, time consuming and costly operation.

In the formation of a bonded assembly in accordance with the practice of the present invention, any suitable adhesive composition can be employed which serves to tenaciously bond the several ring sections together into a substantially rigid assembly and wherein the bond formed is of a strength sufficient to withstand the forces normally imposed on the bonded component during the several finishing operations, as well as during handling between operations. The adhesive also is characterized as one which will not deteriorate upon coming in contact with the various cutting fluids and lubricants employed in the final finishing operations and one which, at the conclusion of the process, can readily be fractured such as by cleaving or applying a shear load to effect a bond rupture. Particularly satisfactory results are achieved employing adhesive compositions consisting of polymerizable compounds having anaerobic curing characteristics which may conveniently be defined as the property of a polymerizable compound to polymerize rapidly and spontaneously to a solid or cured state upon the exclusion of air or oxygen. It will be appreciated that such anaerobic curing properties are particularly desirable in the bonding or adhesive joining of the individual ring sections into a bonded assembly since the adhesive composition can be permitted to stand in contact with air for extended periods of time without polymerizing. However, when applied in the form of a thin film between the abutting surfaces causing an exclusion of air, the adhesive composition rapidly polymerizes and forms a strong bond.

Typical of various classes of resins and catalyst groups which can be satisfactorily employed in the adhesive systems are: an uncured polyester resin and a peroxide catalyst to promote room temperature curing with or without conventional accelerators; an unsaturated maleic alkyd resin dissolved in a copolymerizing monomer such as styrene and a peroxide catalyst; an uncured epoxy resin and a dibasic acid catalyst such as phthalic acid or an amine catalyst such as ethylenediamine; an uncured alkyd resin and a diisocyanate catalyst such as toluene diisocyanate; phenolic one-stage resins and a strong acid such as toluene sulfonic acid; and high boiling monomers such as diallyl phthalate or diallyl maleate with a peroxide catalyst; or the like. Further details of such anaerobic adhesive curing compositions are disclosed in U.S. Pat. Nos. 2,901,099; 3,041,322; 3,043,820; 3,046,262 and 3,218,303, the substance of which are incorporated herein by reference. In addition to the foregoing, a series of cyanoacrylate adhesives available from Eastman Chemical Products, Inc., can also be satisfactorily employed. Two particularly satisfactory adhesives available from the foregoing supplier are available under the designations Eastman 910 MHT and Eastman 910 THT, which provide not only strong bonds, but also are capable of withstanding temperatures up to about 475°F. Alternative satisfactory adhesive compositions which are heat-activatable and/or curable of the various types commercially available and which are of the requisite strength and compatibility, can also be satisfactorily employed for use in the present process.

The manner by which the adhesive is applied to the joining surfaces of the ring sections is not important as long as a relatively thin and uniform bond line is achieved. The preliminarily secured assembly can be clamped under pressure in aligned relationship for a period of time as may be dictated by the type of adhesives employed to assure proper setting of the adhesive joints, whereafter the bonded assembly can be handled free from any further restraints or attachments throughout the remaining processing cycle.

In addition to the split-ring type antifriction bearing assembly as previously described in connection with FIGS. 1–5 of the drawings, similar advantages are obtained in the fabrication of thick-wall split sleeve-type flanged bearings of the type shown in FIGS. 6–9 of the drawings. As shown, a split sleeve or shell-type bearing assembly, indicated at 50, comprises a pair of semicircular sections 52 having integrally formed radially projecting flanges 54 formed with parting faces 56 disposed in a transverse diametrical plane passing through the center line of the bearing assembly 50. Each section 52, such as shown in FIG. 8, is preliminarily formed such as by blanking and stamping and/or forging operations to within relatively close dimensional tolerances approaching those of the final machined bearing assembly. Preferably, at least the parting faces 56 are subjected to further finishing to assure alignment of the two parting faces of each section and the proper degree of surface finish and flatness prior to the application of the adhesive thereto. As in the case of the split-ring type antifriction bearing assembly previously described, the semicircular sections 52 are selected at random and are adhesively bonded together to form bonded bearing assemblies 58, as shown in FIG. 9. The thickness of the adhesive film 60, as shown in FIG. 9, is exaggerated and is preferably controlled to a thickness of only several ten-thousandths of an inch.

After the adhesive film has set, the bonded assembly 58 is subjected to the desired machining operations, including a machining of the front face 62 and rear face 64 of the bonded assembly, the side edges 66 of the flanges 54, the bore 68 of the bonded assembly to a finished size indicated at 70 in phantom in FIG. 9, as well as the outer peripheral surfaces of the bonded assembly as may be necessary or required to provide the appropriate fit of the bearings in seated relationship in the bearing retainer. At the completion of the final finishing and grinding operations, the two perfectly-mated sections 52 are separated by cleaving the bonded assembly at the adhesive bond line and any residual adhesive film on the parting faces 56 is removed. The resultant finish-machined sections are assemblable into a precision sectionalized component, such as the bearing assembly 50 shown in FIGS. 6 and 7.

Another sectionalized precision component which can be advantageously manufactured employing the process of the present invention is a self-aligning bushing 72, such as shown in FIGS. 10 and 11 of the drawings, comprising an annular split or sectionalized housing 74 formed with an internal spherically-shaped seat or socket 76 against which a bushing 78 is slidably seated for pivoting movement relative to the housing. The bushing 78 is formed with an axially extending bore 80 for slidably or rotatably journaling a rod or shaft supported thereby. In the specific embodiment shown in FIGS. 10 and 11, the housing 74 is split longitudinally into two semicircular sections 82 which are retained with their parting edges 84 in appropriate abutting relationship by means of a circular spring clip or retainer 86 disposed in a circumferential groove 88 extending around the periphery of the sectionalized housing as best seen in FIG. 10.

As in the embodiments previously described, a precision mating of the sections comprising the housing is achieved by randomly selecting a pair of preliminarily machined sections 82 and bonding them together with an adhesive forming an integral adhesively-bonded assembly 90, such as shown in FIG. 12. The adhesive layer 92 (the thickness of which is exaggerated in the drawing for illustrative purposes) is applied between the parting edges 84 of the circumferentially aligned sections 82 and upon appropriate setting or curing of the adhesive film, the bonded assembly can be subjected to final accurate machining operations as an integral unit. Typically, final finishing or grinding operations can be performed on the end faces 94 of the sectionalized housing, the cylindrical periphery 96 of the housing including the circumferential groove 88 and the spherical seat or socket 76. The arrangement illustrated in FIG. 12 shows the bonded assembly 90 disposed between the jaws 98 of a suitable clamping fixture to permit grinding of the internal seat 76 by a suitable abrasive finishing tool 100. At the completion of the final precision finishing operations, the housing sections 82 are separated by cleaving the adhesive bond 92 and the parting edges 84 are cleaned preliminary to the assembly of the sectionalized housing around a bushing 78 to form the self-aligning bushing assembly 72, which is retained by the retainer 86.

An alternative satisfactory embodiment of a sectionalized housing 102 is shown in FIG. 13 comprising a pair of annular ring sections 104 which are adhesively secured by means of an adhesive layer 106 in face-to-face abutting relationship forming the bonded assembly. Still other alternative sectional configurations can be employed which are assemblable into the housing or other components of the sectionalized precision components processed in accordance with the present invention to provide the required flexibility and efficiency in the fabrication of the individual sections and the final finishing of the resultant adhesively bonded assembly and such that the parting line between the individual sections of the final assembly is located in a position to provide for optimum performance and durability of the assembly.

While it will be apparent that the invention herein described is well calculated to achieve the benefits and advantages set forth above, it will be appreciated that the invention is susceptible to modification, variation and change without departing from the spirit thereof.

What is claimed is:

1. In a process for fabricating precision components of the type comprising a member which is of a sectionalized construction including a plurality of sections joined together in assembled condition at an interface defined by a respective parting surface of each section, the steps of forming a plurality of sections having a shape and size such that the assembly thereof at the parting surface of each section substantially defines the sectionalized member, applying a thin film of adhesive to at least one said parting surface at each interface, adhesively securing said sections together at the interface defined by the respective parting surface of each section into a bonded assembly in which the sections are disposed in an assembled relationship corresponding to their ultimate operating disposition, finishing at least some of the surfaces of said bonded assembly including a surface incorporating an exposed edge of said interface to the desired final dimensions and surface finish, and thereafter cleaving said bonded assembly and separating the mated finished said sections.

2. The process as defined in claim 1, further characterized by the fact that said sectionalized member is in the form of a ring.

3. The process as defined in claim 1, in which said sectionalized member is in the form of a ring and wherein the step of forming said sections is performed to produce a plurality of ring-shaped sections assemblable into said ring.

4. The process as defined in claim 1, in which said sectionalized member is in the form of a ring and wherein the step of forming said sections is performed to produce a plurality of arcuate sections assemblable into said ring.

5. The process as defined in claim 1, in which said sectionalized member is in the form of a ring and wherein the step of forming said sections is performed to produce a pair of said sections of substantially identical shape and size, each upon assembly defining one half of the sectionalized ring member.

6. The process as defined in claim 1, including the further steps of transferring said bonded assembly through the finishing step as an integral individual unsupported component.

7. The process as defined in claim 1, further characterized in that the step of adhesively securing said sections together is performed in a manner which minimizes the thickness of the adhesive layer.

8. The process as defined in claim 1, including the further step of removing any residual adhesive from the surfaces of the mated finished said sections after cleaving said bonded assembly.

9. The process as defined in claim 1, in which the step of cleaving said bonded assembly is achieved by applying a force on the assembly to effect a shear rupture of the adhesive bond.

10. The process as defined in claim 1, further characterized in the step of adhesively securing said sections together utilizing an anaerobic type adhesive having a film thickness ranging from about 0.0001 to about 0.0003 inch.

11. The process as defined in claim 2, further characterized by the fact that said ring comprises a split-type shell bearing comprised of a pair of semicircular sections the ends of which terminate in a parting surface adapted to be disposed in abutting contact with the parting surface of the other said section.

12. The process as defined in claim 11, including the further step of machining said parting surface to accurate dimensions prior to applying said adhesive thereto to form said bonded assembly.

13. The process as defined in claim 11, in which the step of finishing machining of said bonded assembly includes the inner surface of said bearing to provide the desired cylindrical configuration and size.

14. The process as defined in claim 11, characterized by the fact that each of said sections further includes a flange extending radially from each end thereof in diametrically opposite relationship with the longitudinal faces thereof defining said parting edge surface.

15. The process as defined in claim 2, wherein said ring comprises a split-type housing formed with an internal seating surface for receiving a self-aligning bushing adapted to be slidably disposed therein.

16. The process as defined in claim 15, in which said seating surface is of a spherical configuration and said housing is split along a transverse plane disposed substantially perpendicular to the longitudinal axis of said housing and passing through said housing in the region of the maximum transverse diameter of said seating surface.

17. The process as defined in claim 15, in which said seating surface is of a spherical configuration and said housing is split along a longitudinally extending plane passing through the longitudinal axis of said housing, whereby each section is of a semicircular shape and comprises one-half of said housing.

18. The process as defined in claim 15, including the further steps of providing a bushing, assembling said sections about said bushing and applying fastening means on the assembled said split-type housing to retain said assembly together.

* * * * *